D. HAMBLEN, Jr.
WIND INSTRUMENT.
APPLICATION FILED AUG. 29, 1916.
1,222,285.
Patented Apr. 10, 1917.
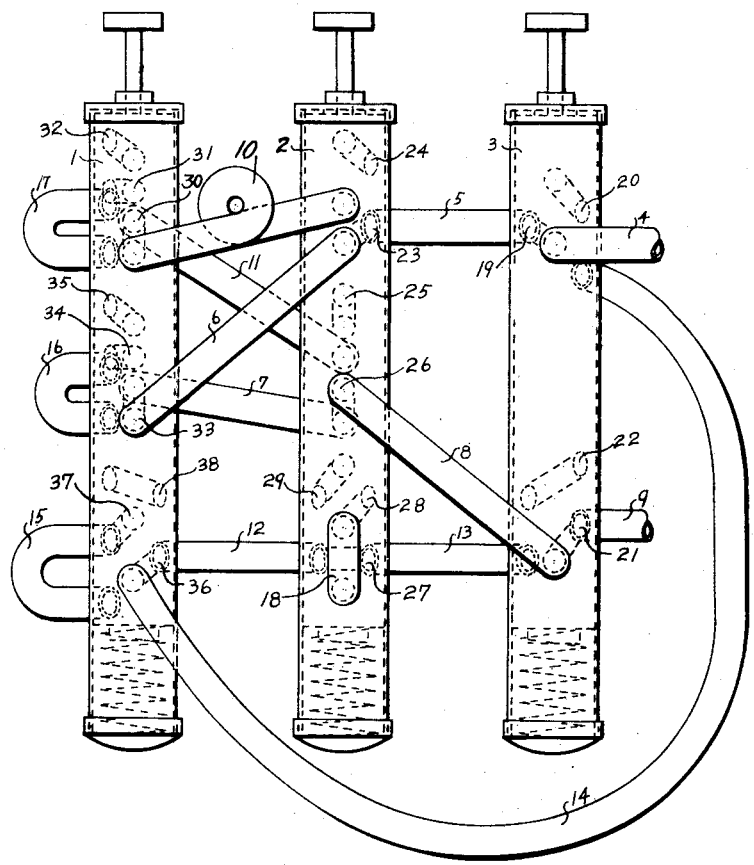
Inventor
David Hamblen, jr.

UNITED STATES PATENT OFFICE.

DAVID HAMBLEN, JR., OF NEWTON, MASSACHUSETTS.

WIND INSTRUMENT.

1,222,285.   Specification of Letters Patent.   Patented Apr. 10, 1917.

Application filed August 29, 1916. Serial No. 117,470.

*To all whom it may concern:*

Be it known that I, DAVID HAMBLEN, Jr., a citizen of the United States, and residing at Newton, in the county of Middlesex and Commonwealth of Massachusetts, have invented certain new and useful Improvements in Wind Instruments, of which the following is a specification.

My invention relates to improvements in three-piston-valve wind instruments by which the chromatic scale is obtained by the addition of supplementary lengths of tubing to the main tube of the instrument so that all the tones lying between the natural tones of the instrument will be in proper pitch.

I attain this object by the mechanism illustrated in the accompanying drawing which is a side view of the valves employed in my improved instrument, the pistons being shown in their position of rest.

The numerals refer to the several parts of the figure.

1, 2, and 3 are the three valves of which the third is connected by pipe 4 with the mouthpiece and by pipe 9 with the bell of the instrument. The valves 2 and 3 are connected by pipes 5 and 8; the valves 1 and 2 are connected by pipes 6 and 7; there are pipe-loops 15, 16, and 17 belonging solely to valve 1, pipe-loop 18 belonging solely to valve 2, pipe-loop formed by pipes 10 and 11 beginning and ending in valve 2 passing through valve 1, and pipe-loop formed by pipes 12, 13, and 14 beginning and ending in valve 3 passing through valves 1 and 2.

The piston of valve 3 has oblique channels 19 and 20 for connecting pipe 4 with either pipes 5 or 14, and oblique channels 21 and 22 for connecting pipe 9 with either pipes 8 or 13.

The piston of valve 2 has oblique channels 23 and 24 for connecting pipe 5 with either pipes 6 or 10, oblique channels 25 and 26 for connecting pipe 8 with either pipe 11 or 7, horizontal channel 27 for connecting pipes 12 and 13, oblique channel 29 for connecting pipe 12 with pipe-loop 18, and oblique channel 28 for connecting pipe-loop 18 with pipe 13. The piston of valve 1 has oblique channel 30 for connecting pipes 10 and 11, horizontal channel 31 for connecting pipe 10 with pipe-loop 17, and oblique channel 32 for connecting pipe-loop 17 with pipe 11; oblique channel 33 for connecting pipes 6 and 7, horizontal channel 34 for connecting pipe 6 with pipe-loop 16, and oblique channel 35 for connecting pipe-loop 16 with pipe 7; oblique channel 36 for connecting pipes 12 and 14, oblique channel 37 for connecting pipe 14 with pipe-loop 15, and oblique channel 38 for connecting pipe-loop 15 with pipe 12.

Seven series of tones can be produced by this device according to the different positions of the pistons; namely, the natural harmonics of the instrument when all pistons are in normal position, one semitone lower than the harmonics by the depression of piston 2 alone, two semitones lower than the harmonics by the depression of piston 1 alone, three semitones lower than the harmonics by the depression of pistons 1 and 2, four semitones lower than the harmonics by the depression of piston 3 alone, five semitones lower than the harmonics by the depression of pistons 2 and 3, and six semitones lower than the harmonics by the depression of the pistons 1 and 3.

*Table of wind-ways.*

| Piston. | | | | | | | | | | | | | | | | | | Note. |
|---|---|---|---|---|---|---|---|---|---|---|---|---|---|---|---|---|---|---|
| 0 | 4 | 19 | 5 | 23 | 6 | 33 | | | 7 | 26 | 8 | 21 | 9 | | | | | g. |
| 2 | 4 | 19 | 5 | 24 | 10 | 30 | | | 11 | 25 | 8 | 21 | 9 | | | | | g-flat. |
| 1 | 4 | 19 | 5 | 23 | 6 | 34 | 16 | 35 | 7 | 26 | 8 | 21 | 9 | | | | | f. |
| 1,2 | 4 | 19 | 5 | 24 | 10 | 31 | 17 | 32 | 11 | 25 | 8 | 21 | 9 | | | | | e. |
| 3 | 4 | 20 | 14 | 36 | | | | | 12 | 27 | 13 | 22 | 9 | | | | | e-flat. |
| 2,3 | 4 | 20 | 14 | 36 | 12 | | | 29 | 18 | 28 | 13 | 22 | 9 | | | | | d. |
| 1,3 | 4 | 20 | 14 | 37 | 15 | | | 38 | 12 | 27 | 13 | 22 | 9 | | | | | d-flat. |
| 0 | 4 | 19 | 5 | 23 | 6 | 33 | | | 7 | 26 | 8 | 21 | 9 | | | | | c. |

Having now described my invention, what I claim as new, and desire to secure by Letters Patent, is—

A wind musical instrument having three piston-valves, the depression of the first piston lowering the harmonics two semitones, the second one semitone, and the third four semitones, a pipe-loop 14—36—12—

27—13, a second pipe-loop 10—30—11, and supplementary pipe-loops 15, 17, and 18; said first pipe-loop beginning and ending in valve 3 and passing through valves 1 and 2 so that when the pistons of valves 1 and 3 are both depressed supplementary pipe-loop 15 is added; the pipe-loop 15 having sufficient length to lower two additional semitones the harmonics that have been lowered four semitones by the addition of pipe-loop 14—36—12—27—13; and so that when the pistons of valves 2 and 3 are both depressed supplementary pipe-loop 18 is added; the pipe-loop 18 having sufficient length to lower one additional semitone the harmonics that have been lowered four semitones by the addition of pipe-loop 14—36—12—27—13; the second pipe-loop beginning and ending in valve 2 passing through valve 1 so that when the pistons of valves 1 and 2 are both depressed supplementary pipe-loop 17 is added; the pipe-loop 17 having sufficient length to lower two additional semitones the harmonics that have been lowered one semitone by the addition of pipe-loop 10—30—11.

DAVID HAMBLEN, Jr.

Copies of this patent may be obtained for five cents each, by addressing the "Commissioner of Patents, Washington, D. C."